US011421356B2

(12) United States Patent
Malloy et al.

(10) Patent No.: US 11,421,356 B2
(45) Date of Patent: Aug. 23, 2022

(54) BRAIDED, REFLECTIVE TEXTILE SLEEVE AND METHOD OF CONSTRUCTION THEREOF

(71) Applicant: Federal-Mogul Powertrain, LLC, Southfield, MI (US)

(72) Inventors: Cassie M. Malloy, Trappe, PA (US); Qingtong Ge, Exton, PA (US); Tianqi Gao, Exton, PA (US); Edgar Muela, El Paso, TX (US); Danny Winters, Downingtown, PA (US)

(73) Assignee: Federal-Mogul Powertrain LLC, Southfield, MI (US)

( * ) Notice: Subject to any disclaimer, the term of this patent is extended or adjusted under 35 U.S.C. 154(b) by 260 days.

(21) Appl. No.: 15/530,182

(22) Filed: Dec. 8, 2016

(65) Prior Publication Data

US 2017/0167062 A1 Jun. 15, 2017

Related U.S. Application Data

(60) Provisional application No. 62/265,282, filed on Dec. 9, 2015.

(51) Int. Cl.
*D04C 1/02* (2006.01)
*D04C 1/06* (2006.01)
*H02G 3/04* (2006.01)

(52) U.S. Cl.
CPC .................. *D04C 1/02* (2013.01); *D04C 1/06* (2013.01); *H02G 3/0481* (2013.01);
(Continued)

(58) Field of Classification Search
CPC .......... D04C 1/02; D04C 1/06; H02G 3/0481; D10B 2403/02411; D10B 2505/12;
(Continued)

(56) References Cited

U.S. PATENT DOCUMENTS 4,741,087 A * 5/1988 Plummer, Jr. ...... B29C 61/0658
138/123
4,777,859 A * 10/1988 Plummer, Jr. ...... B29C 61/0658
138/123
(Continued)

FOREIGN PATENT DOCUMENTS

CN 1499538 A 5/2004
EP 1422728 A 5/2004
(Continued)

OTHER PUBLICATIONS

International Search Report, dated Mar. 28, 2017 (PCT/US2016/065706).

*Primary Examiner* — Jocelyn Bravo
(74) *Attorney, Agent, or Firm* — Robert L. Stearns; Dickinson Wright, PLLC

(57) ABSTRACT

A braided textile sleeve having a flexible, seamless, reflective tubular wall and method of construction thereof are provided. The tubular wall extends along a longitudinal axis between opposite open ends and includes a first set of yarns and a second set of yarns braided with one another. The first and second yarns are provided as different types of yarns from one another and are braided in opposite helical directions with one another. The tubular wall includes a third set of yarns captured between the first and second sets of yarns, with the third set of yarns extending substantially parallel to the longitudinal axis. The sleeve includes a reflective outer layer fixed to an outer surface of the braided yarns.

13 Claims, 1 Drawing Sheet

(52) U.S. Cl.
CPC ............... *D10B 2401/20* (2013.01); *D10B 2403/02411* (2013.01); *D10B 2505/12* (2013.01)

(58) Field of Classification Search
CPC ............ D10B 2401/20; D07B 1/148; D07B 2201/2088; D07B 2201/2089; D07B 2201/209; D07B 2201/2094
USPC ................................................ 87/1, 7, 8, 9
See application file for complete search history.

(56) References Cited

U.S. PATENT DOCUMENTS

| | | | | |
|---|---|---|---|---|
| 4,929,478 | A * | 5/1990 | Conaghan | F16L 57/06 138/103 |
| 5,197,370 | A * | 3/1993 | Gladfelter | D04C 1/06 87/7 |
| 5,613,522 | A * | 3/1997 | Ford | D03D 1/0043 138/123 |
| 5,843,542 | A * | 12/1998 | Brushafer | F16L 11/02 428/36.1 |
| 6,148,865 | A * | 11/2000 | Head | B29C 70/222 138/123 |
| 6,250,193 | B1 * | 6/2001 | Head | B29C 70/222 87/1 |
| 6,887,543 | B1 * | 5/2005 | Louart | B29D 23/001 138/118 |
| 2003/0044155 | A1 * | 3/2003 | Maiden | D03D 3/02 385/137 |
| 2004/0091655 | A1 * | 5/2004 | Niwa | D04C 1/06 428/36.3 |
| 2004/0109965 | A1 * | 6/2004 | Klinklin | F16L 57/00 428/36.3 |
| 2007/0275199 | A1 | 11/2007 | Chen | |
| 2008/0135119 | A1 * | 6/2008 | Tonooka | D03D 1/0043 138/110 |
| 2013/0125739 | A1 * | 5/2013 | Kinugasa | D04C 1/06 87/9 |
| 2014/0220276 | A1 | 8/2014 | Gao et al. | |
| 2016/0084898 | A1 * | 3/2016 | Genoulaz | G01R 31/58 324/539 |

FOREIGN PATENT DOCUMENTS

| | | |
|---|---|---|
| GB | 2238061 A | 5/1991 |
| JP | H11311396 A | 11/1999 |
| JP | 2001522950 A | 11/2001 |
| JP | 2004176243 A | 6/2004 |
| JP | 2013123368 A | 6/2013 |
| JP | 2016511801 A | 4/2016 |

* cited by examiner

BRAIDED, REFLECTIVE TEXTILE SLEEVE AND METHOD OF CONSTRUCTION THEREOF

CROSS-REFERENCE TO RELATED APPLICATION

This application claims the benefit of U.S. Provisional Application Ser. No. 62/265,282, filed Dec. 9, 2015, which is incorporated herein by reference in its entirety.

BACKGROUND OF THE INVENTION

1. Technical Field

This invention relates generally to textile sleeves for protecting elongate members, and more particularly to braided textile sleeves having a reflective outer layer.

2. Related Art

Tubular textile sleeves are known for use to provide protection to internally contained elongate members, such as a wire harness, fluid or gas conveying tubes, or cable, for example. It is further known to apply a reflective outer layer to the sleeve to provide the sleeve with an ability to protect the elongate member against exposure to heat. The textile sleeves are often woven or braided, with each type of construction having known pros and cons. With woven sleeves, the sleeves are often woven having a tight weave construction, which can provide the benefit of maintaining the sleeve in a generally round, tubular configuration; however, it tends to be too stiff in application, and thus, can be difficult to route about sharp bends, and is further subject to kinking. With braided sleeves, the sleeves are generally loose, and thus, the sleeve wall typically collapses on itself upon being constructed. As such, if the braided sleeve has a reflective outer layer, the outer layer is often damaged, such as during shipping, as a result of the wall collapsing and the reflective outer layer folding. Further, known braided sleeves also exhibit kinking when be routed about sharp bends.

A braided, reflective sleeve constructed in accordance with the invention overcomes at least those disadvantages discussed above, while other benefits may become readily recognized by those possessing ordinary skill in the art.

SUMMARY OF THE INVENTION

A textile sleeve having a flexible, seamless, reflective tubular wall is provided. The tubular wall extends along a longitudinal axis between opposite open ends and includes a first set of yarns and a second set of yarns braided with one another, wherein the first and second yarns are braided in opposite helical directions with one another. The tubular wall further includes a third set of yarns captured between the first and second sets of yarns, such that the third set of yarns extending generally parallel to the longitudinal axis to facilitate maintaining the structural integrity of the wall by maintaining its tubular shape. Further, the tubular wall has a reflective outer layer bonded to an outer surface of the braided yarns to protect members contained within the sleeve against external thermal effects.

In accordance with another aspect of the invention, the protective first set of yarns can be braided as single, individual yarns separately from one another and the second set of yarns can be braided as separate, discrete bundles, with each bundle including a plurality of yarns. The first set of yarns provide the sleeve with a first set of physical protective properties and the second set of bundled yarns provide the sleeve with a second set of physical protective properties different from the first set of physical properties. The synergies of the first and second sets of physical protective properties optimize the ability of the sleeve to protect the members contained therein against contamination and thermal effects, while also enhancing the flexibility of the sleeve without cracking the reflective outer layer, as well as enhancing ability of the sleeve to retain its desired shape, without kinking, and protective attributes.

In accordance with another aspect of the invention, the single yarns of the first set of yarns can be provided as multifilaments to enhance the coverage (minimizing the size of openings between adjacent yarns), flexibility and dampening characteristics against impact forces.

In accordance with another aspect of the invention, the plurality of yarns can be provided as monofilaments to enhance maintaining the structural integrity of the sleeve, including desired stiffness, shape and anti-kinking properties while being flexed and routed about bends, while also enhancing the resistance to abrasion.

In accordance with another aspect of the invention, the individual monofilaments can be provided as heat-settable yarns to allow the wall to be heat-set, thereby acting to further maintain the structural integrity of the sleeve, including desired stiffness, shape and anti-kinking properties, while also enhancing the ability to apply the reflective outer layer on the outer surface of the braided yarns, if heat-set prior to applying the reflective outer layer.

In accordance with another aspect of the invention, the third set of yarns can be provided as multifilaments to enhance the retention of the helical first and second sets of yarns in their desired location to facilitate maintaining the wall in a stable, tubular configuration, thereby enhancing the ability to assemble the elongate members being protected through an inner cavity of the sleeve and further to enhance the resistance to kinking while routing the sleeve about bends.

In accordance with another aspect of the invention, a method of constructing a textile sleeve is provided. The method includes braiding a tubular wall including a first set of yarns extending in a first helical direction, a second set of yarns extending in a second helical direction opposite the first helical direction, and a third set of yarns extending substantially parallel to a longitudinal axis of the sleeve. The method further includes applying a reflective outer layer on an outer surface of the wall.

In accordance with another aspect of the method of construction, the braiding can include braiding the first and second sets of yarns about the third set of yarns to capture the third set of yarns between the first and second sets of yarns.

In accordance with another aspect of the method of construction, the braiding can include maintaining the third set of yarns in a static position while braiding the first and second set of yarns about the third set of yarns.

In accordance with another aspect of the method of construction, the braiding can include braiding the first set of yarns as individual multifilaments from separate carriers and braiding the second set of yarns as bundled groups of monofilaments, such that each bundle of monofilaments is braided as a single member from a common carrier.

In accordance with another aspect of the invention, the method can include heat-setting at least some of the yarns to facilitate maintaining the sleeve with a substantially round, tubular shape.

In accordance with another aspect of the invention, the method can include heat-setting the bundled groups of monofilaments to facilitate maintaining the sleeve having a substantially round, tubular shape and to further enhance the ability of the sleeve to resist kinking while being routed about bends and to further enhance the resistance of the reflective outer layer to cracking.

In accordance with another aspect of the invention, the method can include heat-setting the bundled groups of monofilaments to facilitate maintaining the sleeve having a substantially round, tubular shape prior to applying the reflective outer layer on the wall to enhance the ability to apply the reflective outer layer on the outer surface of the braided wall in a substantially uniform, wrinkle free fashion.

BRIEF DESCRIPTION OF THE DRAWINGS

These and other aspects, features and advantages of the invention will become readily apparent to those skilled in the art in view of the following detailed description of the presently preferred embodiments and best mode, appended claims, and accompanying drawings, in which:

DETAILED DESCRIPTION OF PREFERRED EMBODIMENTS

Figure 1:
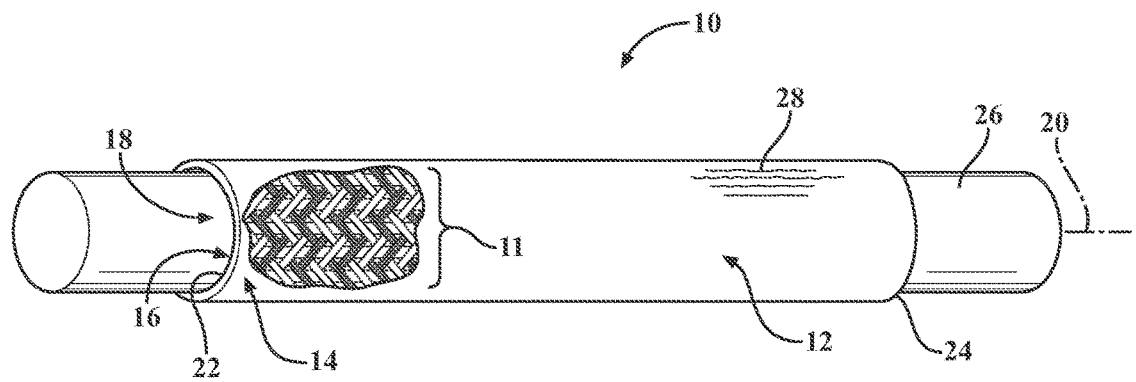
FIG. 1 is a schematic, partially broken away, perspective view of a protective textile sleeve constructed in accordance with one aspect of the invention.

Referring in more detail to the drawings, FIG. 1 shows a tubular textile sleeve 10 constructed according to one embodiment of the invention. The textile sleeve 10 includes a plurality of yarns 11 interlaced with one another via a braiding process to form a wall 12. The wall 12 is braided in seamless fashion and thus, is circumferentially continuous having an outer surface 14 and an inner surface 16 defining a cavity 18 extending axially along a central longitudinal axis 20 between opposite ends 22, 24 of the sleeve 10. The cavity 18 is sized for receipt of an elongate member 26 to be protected, such as a wire harness, fluid or gas conveying conduit, cable or the like. The wall 12 has an outer reflective layer 28 bonded thereto to protect the elongate member 26 against thermal effects from the surrounding environment, such as within an engine compartment, by way of example and without limitation. The wall 12 is braided such that it maintains or substantially maintains a round tubular shape, while the wall 12 is also sufficiently flexible such that is can be routed about sharp bends without kinking and without causing damaged to the reflective outer layer 28.

The wall 12 can be constructed having any suitable length and diameter and is braided having a tight braid structure, provided by a high picks-per-inch (PPI), such as up to about 20 PPI, by way of example and without limitation, to enhance the hoop strength of the wall 12. The wall 12 has a first set of yarns 30 extending in a first helical direction, a second set of yarns 32 extending in a second helical direction opposite the first helical direction, and a third set of yarns 34 extending generally parallel to the central longitudinal axis 20 of the sleeve 10. The first set of yarns 30 are braided with the second set of yarns 32 in opposite helical relation with one another.

The first set of yarns 30 include individual multifilaments 36 braided separately from one another and braided with the second set of yarns 32, such as in a plain braid pattern, by way of example and without limitation. The multifilaments 36 can be provided of a material type, such as fiberglass, mineral yarns, and the like, and denier as desired for the intended application, and in accordance with one embodiment were provided as glass fibers having a denier of about 3923. Further, the multifilaments 36 can be provided as non-heat-settable yarns.

The second set of yarns 32 can be provided as monofilaments 38 of a material type, including heat-settable polymeric yarns, and diameter as desired for the intended application, and in accordance with one embodiment, were provided as heat-settable polyethylene terephthalate (PET) having a diameter of about 0.376 mm. The yarns 32 are bundled as individual groups 42 of the monofilaments 38, wherein each group 42 includes a plurality of the yarns 32 arranged in side-by-side relation, shown as three, by way of example and without limitation, such that the individual groups 42 are braided as though they are a single yarn from a common carrier.

Figure 2:
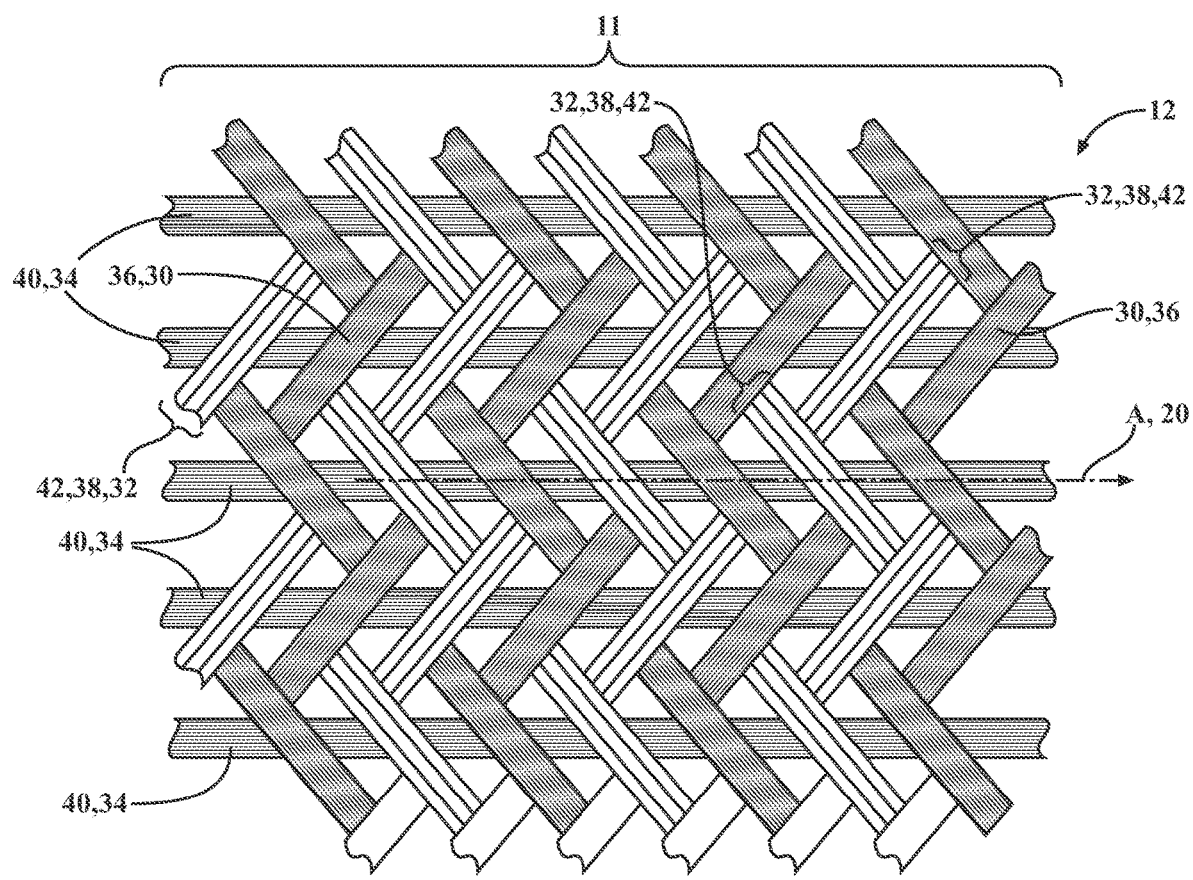
FIG. 2 is an enlarged, fragmentary exemplary view of an interlaced portion of the wall of the sleeve of FIG. 1 in accordance with one aspect of the invention.

The third set of yarns 34 include individual multifilaments 40 spaced circumferentially from one another, wherein the spacing can be uniform or non-uniform, as desired. The multifilaments 40 can be provided of the material type and denier as the first set of yarns 30, or different, depending on the nature of the intended application. During the braiding process, the third set of yarns 34 can remain fixed in position while the first and second sets of yarn 30, 32 are braided to capture the third set of yarns 34 therebetween. As such, the third set of yarns 34 are sandwiched between the first and second sets of yarn 30, 32. With the third set of yarns 34 being captured, and extending purely lengthwise along the arrow A (FIG. 2) in parallel or substantially parallel (substantially is being used to indicate that the yarns 34 could be slightly skewed relative to the central axis 20, but one viewing the yarns 34 would generally consider them to be parallel to the central axis 20), the yarns 34 function, at least in part, to provide stability against expansion and contraction to the braided sleeve 10, thereby promoting the wall 12 to remain in a round, tubular configuration, thereby acting to inhibit the wall 12 from collapsing on itself, which in turn facilitates installation of the sleeve, particular about meandering paths.

The reflective outer layer 28 can be provided as any suitable reflective metal material, such as aluminum foil, by way of example and without limitation. The reflective outer layer 28 can be wrapped in cigarette fashion, with opposite lengthwise extending edges of a generally rectangular sheet being brought into overlapping relation with one another, or it can be applied as a spiral wrapped layer from a helically wrapped strip of metal foil, as desired.

In accordance with another aspect of the invention, a method of constructing a textile sleeve 10 is provided. The method includes forming a seamless, tubular wall 12 via braiding first and second sets of yarns 30, 32 about the third set of yarns 34 to capture the third set of yarns 34 between the first and second sets of yarns 30, 32. Further, bonding a reflective outer layer 28 to an outer surface 14 of the wall 12. Further yet, during the braiding process, maintaining the third set of yarns 34 in a static position in parallel or substantially parallel relation with a central axis 20 of the sleeve 10 while braiding the first and second set of yarns 30, 32 about the third set of yarns.

In accordance with another aspect of the method of construction, the braiding can include braiding the first set of yarns 30 as individual multifilaments 36 and braiding the second set of yarns 32 as bundled groups 42 of monofilaments 38, such that each bundle 42 is braided as a single member from a common carrier. Further yet, the method can also include heat-setting at least some of the yarns, such as the bundled monofilaments 38, thereby enhancing the ability of the sleeve wall 12 to maintain its substantially round, tubular outer peripheral shape, which not only enhances the hoop strength, but also acts to inhibit kinking of the wall 12 when routed about meandering paths, as well as reducing the likelihood of damage to the outer reflective layer 28. Further yet, the method can include leaving at least some of the yarns, such as the multifilaments 36, having a non-heat-set condition, thereby enhancing the flexibility and dampening ability (ability to absorb impact forces) of the sleeve wall 12.

It is to be understood that the above detailed description is with regard to some presently preferred embodiments, and that other embodiments readily discernible from the disclosure herein by those having ordinary skill in the art are incorporated herein and considered to be within the scope of any ultimately allowed claims.

What is claimed is:

1. A protective textile sleeve, comprising:
a circumferentially continuous, seamless tubular wall extending along a longitudinal axis between opposite open ends, said tubular wall having a first set of yarns and a second set of yarns braided with one another, wherein said first set of yarns are braided as individual multifilaments and said second set of yarns are braided as bundles, with each bundle including a plurality of monofilaments in side-by-side relation, wherein each bundle of monofilaments extending in a first helical direction is spaced from an adjacent bundle of monofilaments extending in the first helical direction by at least one of said individual multifilaments extending in the first helical direction, and wherein each bundle of monofilaments extending in a second helical direction is spaced from an adjacent bundle of monofilaments extending in the second helical direction by at least one of said individual multifilaments extending in the second helical direction, said tubular wall having a third set of yarns captured between said first and second sets of yarns, said third set of yarns extending generally parallel to said longitudinal axis; and
a reflective outer layer bonded to an outer surface of the wall,
wherein each bundle includes about 3 monofilaments.

2. The protective textile sleeve of claim 1, wherein said monofilaments are heat-set.

3. The protective textile sleeve of claim 1, wherein said third set of yarns are multifilaments.

4. The protective textile sleeve of claim 1, wherein each of said monofilaments has a diameter of about 0.376 mm.

5. The protective textile sleeve of claim 1, wherein each bundle has three monofilaments.

6. The protective textile sleeve of claim 1, wherein said multifilaments are fiberglass and/or mineral yarn and said monofilaments are polyethylene terephthalate.

7. A protective textile sleeve, comprising:
a circumferentially continuous, seamless tubular wall extending along a longitudinal axis between opposite open ends, said tubular wall having a first set of yarns and a second set of yarns braided with one another, wherein said first set of yarns are braided as individual multifilaments and said second set of yarns are braided as bundles of monofilaments in side-by-side relation, wherein each bundle of monofilaments extending in a first helical direction is spaced from an adjacent bundle of monofilaments extending in the first helical direction by at least one of said multifilaments extending in the first helical direction, and wherein each bundle of monofilaments extending in a second helical direction is spaced from an adjacent bundle of monofilaments extending in the second helical direction by at least one of said individual multifilaments extending in the second helical direction,
wherein each bundle includes about 3 monofilaments.

8. The protective textile sleeve of claim 7, further including a third set of yarns captured between said first and second sets of yarns, said third set of yarns extending generally parallel to said longitudinal axis.

9. The protective textile sleeve of claim 7, further including a reflective outer layer bonded to an outer surface of the wall.

10. The protective textile sleeve of claim 7, wherein each bundle has three monofilaments.

11. The protective textile sleeve of claim 7, wherein said multifilaments are fiberglass and/or mineral yarn and said monofilaments are polyethylene terephthalate.

12. The protective textile sleeve of claim 7, wherein at least some of said monofilaments are heat-set.

13. A protective textile sleeve, comprising:
a circumferentially continuous, seamless tubular wall extending along a longitudinal axis between opposite open ends, said tubular wall having a first set of yarns and a second set of yarns braided with one another, wherein said first set of yarns are braided as individual multifilaments and said second set of yarns are braided as bundles of monofilaments in side-by-side relation, wherein each bundle of monofilaments extending in a first helical direction is spaced from an adjacent bundle of monofilaments extending in the first helical direction by at least one of said multifilaments extending in the first helical direction, and wherein each bundle of monofilaments extending in a second helical direction is spaced from an adjacent bundle of monofilaments extending in the second helical direction by at least one of said individual multifilaments extending in the second helical direction,
wherein each of said monofilaments has a diameter of about 0.376 mm.

* * * * *